United States Patent
Wada

(12) 
(10) Patent No.: US 6,216,347 B1
(45) Date of Patent: Apr. 17, 2001

(54) ROTARY CUTTING PLIERS

(76) Inventor: Minoru Wada, 7-14, 2-Chome Shobu-ch, Kashihara City, Nara Pref, 634-0042 (JP)

( * ) Notice: Subject to any disclaimer, the term of this patent is extended or adjusted under 35 U.S.C. 154(b) by 0 days.

(21) Appl. No.: 09/341,150

(22) PCT Filed: Jan. 19, 1998

(86) PCT No.: PCT/JP98/00225

§ 371 Date: Jul. 16, 1999

§ 102(e) Date: Jul. 16, 1999

(87) PCT Pub. No.: WO98/32573

PCT Pub. Date: Jul. 30, 1998

(30) Foreign Application Priority Data

Jan. 22, 1997 (JP) ................................................... 9-042817

(51) Int. Cl.[7] .......................... B26B 13/00; B26B 13/26; B23B 19/02
(52) U.S. Cl. ................................................. 30/250; 30/262
(58) Field of Search ............................. 30/249, 250, 252, 30/261, 262

(56) References Cited

U.S. PATENT DOCUMENTS

| | | | | |
|---|---|---|---|---|
| 3,210,844 | * | 10/1965 | Tontscheff | 30/250 |
| 4,223,439 | * | 9/1980 | Rommel | 30/250 |
| 4,644,650 | * | 2/1987 | Laux et al. | 30/250 |
| 4,677,748 | * | 7/1987 | Kobayashi | 30/250 |
| 4,779,342 | * | 10/1988 | Kobayashi et al. | 30/250 |

FOREIGN PATENT DOCUMENTS

| | | |
|---|---|---|
| 60-217014 | 10/1985 | (JP) . |
| 8-66820 | 3/1996 | (JP) . |

* cited by examiner

*Primary Examiner*—Douglas D. Watts
(74) *Attorney, Agent, or Firm*—Arent Fox Kintner Plotkin & Kahn, PLLC

(57) ABSTRACT

Rotary cutting pliers for cutting electric wires, having large, medium and small diameters. An electric wire is inserted into an insertion space that is open from the rotary center of a first bearing disk mounted on a first unit of the pliers so that the electric wire comes in contact with the rotary center. The wire is cut by a curved cutter in the insertion space or by a curved or circumferential cutter on a rotor embedded in the first bearing disk. A second bearing disk mounted on a second unit has a second insertion space that is inclined from the rotary center. A curved cutter in a third insertion space of the second bearing disk is open from the rotary center of a rotary disk. The rotary disk has a ratchet on the circumference that can be incorporated into the first bearing disk to complete contact with aligned supporting points at the intersection of the insertion spaces of the first and second bearing disks and with the surfaces of the curved cutters of the first and second bearing disks. The rotary disk is rotated and retained at various angles so as to allow the pliers to admit large diameter wires. The rotary disk is rotated with a feed pawl and a fixed pawl through repeated openings and closings of the handles of the first and second units to positions the rotary disk for cutting a variety of wire diameters more efficiently.

3 Claims, 4 Drawing Sheets

ROTARY CUTTING PLIERS

FIELD OF THE INVENTION

The present invention relates to improved cutting pliers for cutting electric wires.

TECHNOLOGICAL BACKGROUND

On conventional cutting pliers, the cutting area is formed by laterally spaced bearing circumferences joined by a supporting point. Generally, a clearance exists between the circumference of the object to be cut and straight cutter blades when the object is inserted into the V-shaped cutting space. This arrangement of a circular object and straight cutter blades results in a reduced cutting force because the greatest cutting force is closest to the supporting point. The reduced cutting force is particularly acute for large diameter wires. An ineffective distance of the lever action in conventional cutting pliers is caused by three elements: the radius of the supporting shaft, the thickness of the cutter bearing, and the clearance between the circumference of the electric wire that is inserted into the V-shaped cutting space and the cutter blade base. In eccentric cutting pliers, in which the front of the bearings is thinner, the ineffective distance is decreased and the cutting force is increased 1.5 times above the conventional force.

In the shaftless super cutting pliers of Japanese Patent Application No. 25295 the supporting axis is removed, and the cutters are formed directly from the supporting point and are supported by a circumferential ring on a cutter arm, thereby eliminating the ineffective distance of the aforementioned working distance and additionally increasing the cutting force 2.5 times. On the other hand, these innovative cutting pliers that initially allowed closer access to the supporting point were incapable of eliminating the ineffective distance due to an unavoidable, small clearance between the circumference of the electric wires, the cutters and the supporting points. In operation, a smaller clearance could only be achieved by opening the handle more. Also in the shaftless cutting pliers, both cutters formed from the supporting point opened in V-shape, resulting in the ineffective distance.

OBJECT OF THE INVENTION

It is an object of the present invention to provide pliers that enable and obtain a maximum cutting force, such that the ineffective distance between the cutting blades and the cutting object is eliminated.

SUMMARY OF THE INVENTION

In the circumferential supporting means of the present invention, the positioning of the cutting curves of both cutters from the supporting point is according to the circumference of the electric wires. The cutting pliers can adjust to different wire diameters and inserting a wire between the curved cutters allows the circumference on one side of the electric wire to make contact with the supporting point, thus eliminating the ineffective distance. Thus, only one cutter needs to be rotated, to perform cutting.

DETAILED DESCRIPTION OF THE PREFERRED EMBODIMENT

Figure 1:
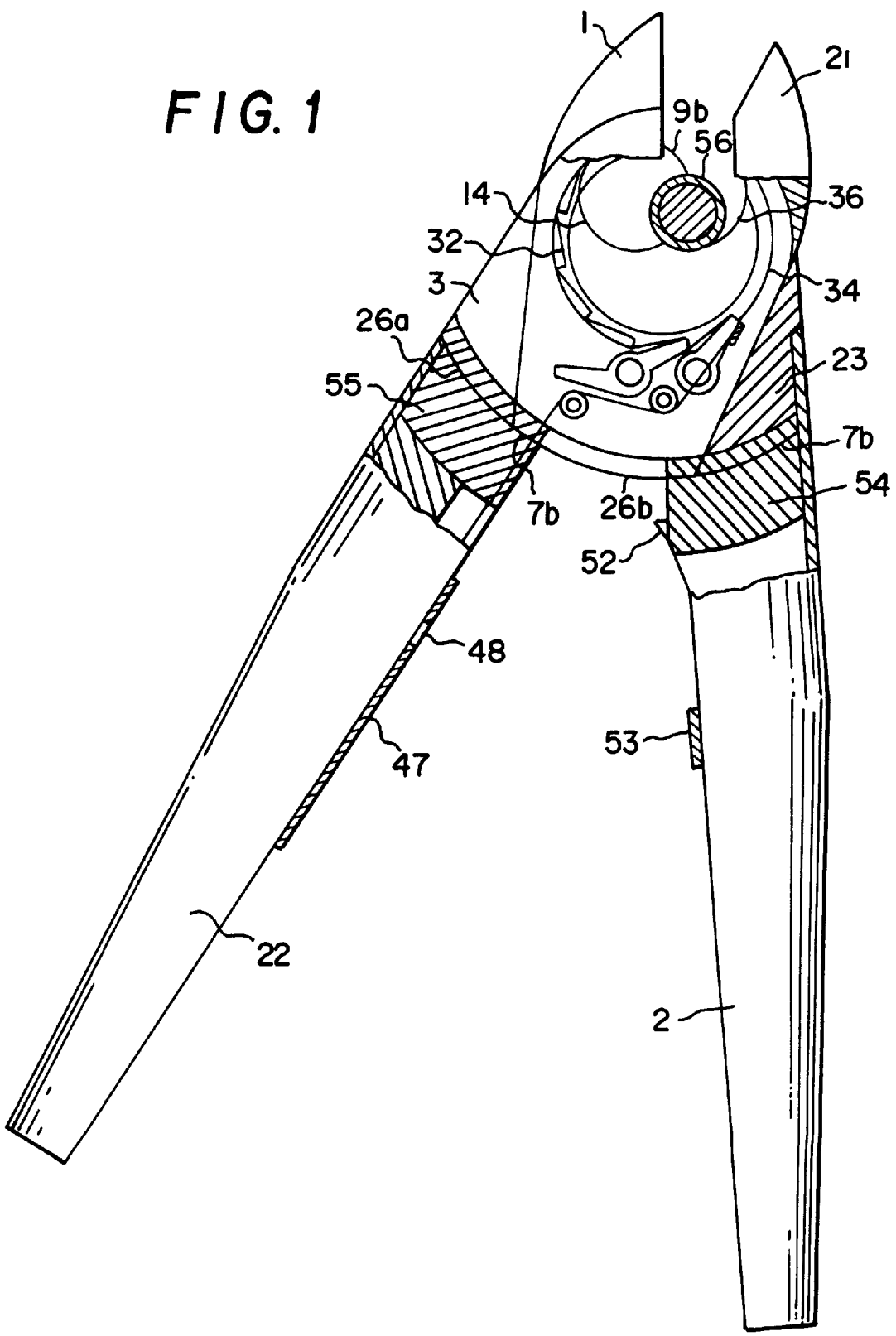
FIG. 1 shows the front view of the present invention.

Rotary cutting pliers have a first unit 100 and a second unit 200 axially joined to each other at their respective rotary centers 0. The first unit 100 has a first bearing disk 8 that projects upward from a first handle 2 and a lower disk portion 3. The upper part of first bearing disk 8 has a first insertion space 12 for inserting an electric wire. The first insertion space 12 opens vertically upward from the rotary center 0 of the first bearing disk 8. The second unit 200 has a second bearing disk 27 that projects upward from a second handle 22. The second bearing disk 27 has an inclined insertion space 31 and a third insertion space 37 through which an electric wire is inserted to be cut. Second and third insertion spaces open upward, but inclined insertion space 31 is inclined at a 30° angle from the vertical center of rotary center 0. The concave bottoms of insertion spaces 31 and 37 are axially aligned at rotary center 0. See FIG. 4.

Figures 2, 3:
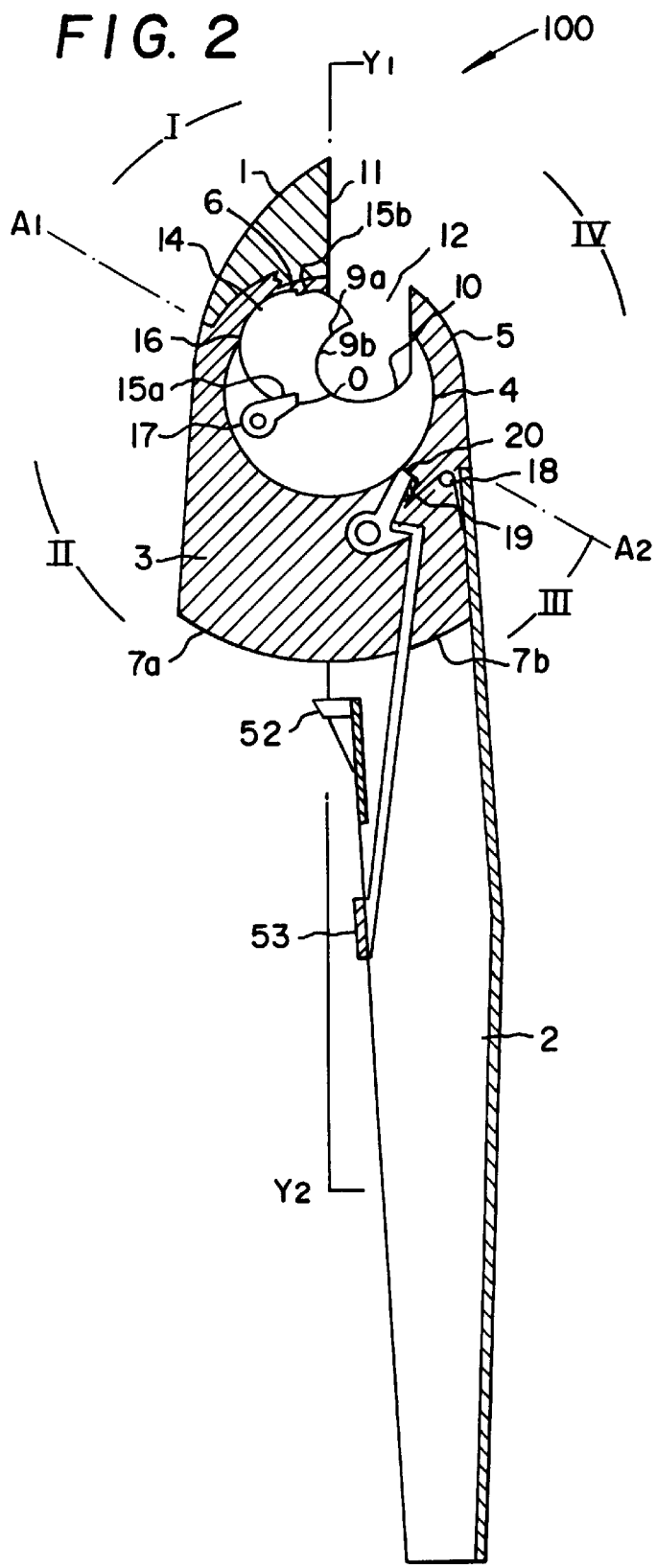
FIG. 2 shows the longitudinal sectional view of the first unit in FIG. 1.
FIG. 3 shows the longitudinal sectional view of Line $Y_1$-$Y_2$ in FIG. 2.

In FIG. 2, from rotary center 0, wire catcher 1 of the first unit 100 projects upward from bearing disk 8 and handle 2. Wire catcher 1 admits the electric wire 56 for cutting by first curved cutter 9a. First curved cutter 9a is positioned between the longitudinal edge 11 of the wire catcher 1 and lower disk portion 3. The curvature of the first curved cutter 9a matches the circumference of the electric wire 56 thereby eliminating spaces between the circumference of the electric wire and the cutter. The electric wire 56 is inserted into the pliers through first insertion space 12 formed by the longitudinal edge 11 of the wire catcher 1 and catcher guide 5. First bearing disk 8 has a recessed inner circumference 4 of constant depth and a constant radius. Vertical or first insertion space 12 has a concave bottom 10 that is axially aligned with the rotary center 0. Concave bottom 10 of bearing disk 8 has an inner diameter equal to the outside diameter of rotor 14. A spindle 13 is disposed on the rear face of bearing disk 8.

A rotor 14, is mounted to the inner circumference 4 of first bearing disk 8 of the first unit 100. One side of the circumference of the rotor 14 is a convex-shaped circumferential cutter 16, and the other side of the rotor is a concave-shaped first curved cutter 9b. Rotor 14 comes in contact with the rotary center 0 of the bearing disk 8. The radius of curved plane 9a in the first insertion space 12 is the same as that of the curved cutter 9b of rotor 14. When the rotor 14 is not set, the curved plane 9a acts as a cutter. An adjustment lever 17 is mounted on first bearing disk 8 and can be accommodated in either one-way rotor port 15a, or one-way rotor port 15b to retain the rotor in a predetermined cutting position. When it is desired to cut a large diameter wire, the rotor 14 is rotated such that the curved cutter 9b of rotor 14 faces curved cutter 36 of the second bearing unit 200. The rotor is retained by the adjustment lever inside of one-way rotor port 15a.

In another embodiment, circumferential cutter 16 is used to cut medium and small diameter wires. In operation, the rotor 14 is rotated such that circumferential cutter 16 of the first unit 100 faces curved cutter 36 of the second unit 200.

Figure 7A:
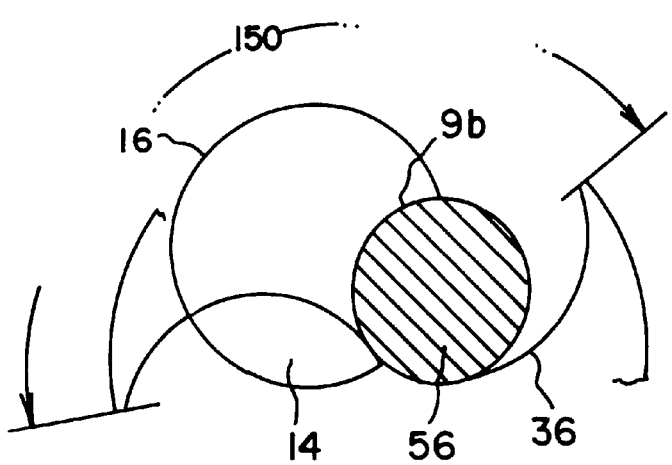
FIG. 7 shows three ways of cutting different wire diameters in the present invention.
Figure 7B:
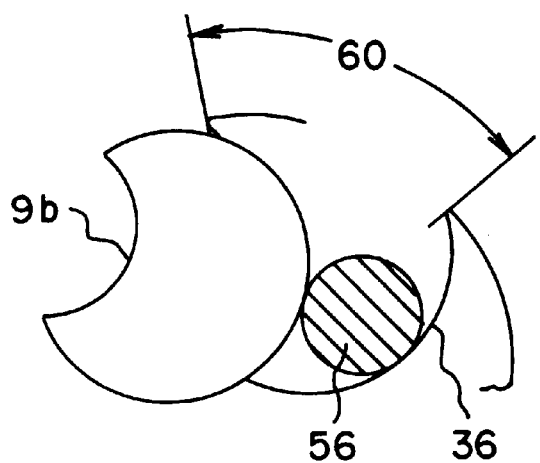
Figure 7C:
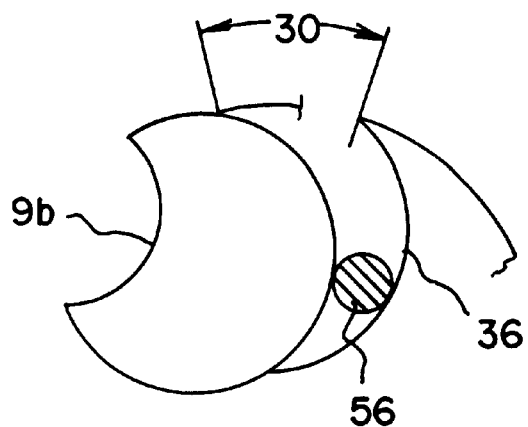

The rotor 14 is retained in this position by one-way rotor port 15*b*. See FIGS. 7B and 7C.

Figure 4:
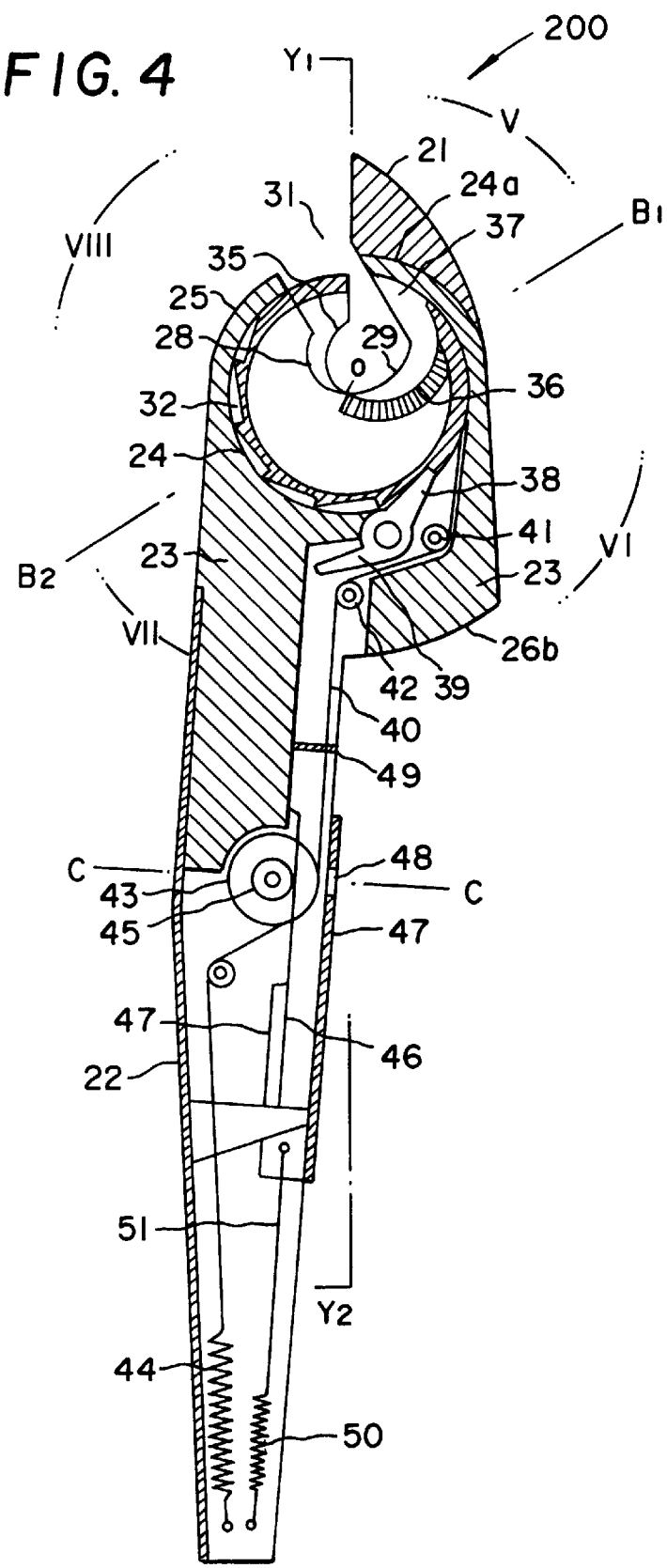
FIG. 4 shows the longitudinal sectional view of the second unit in FIG. 1.
Figure 5:
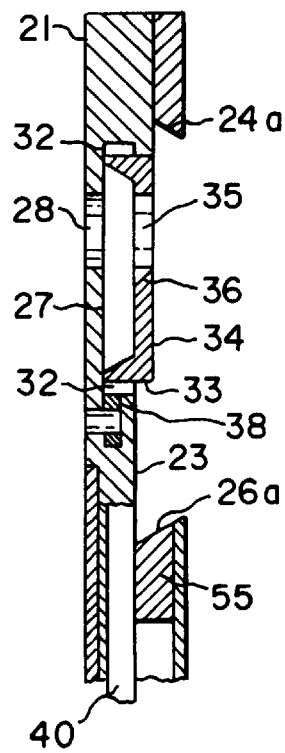
FIG. 5 shows the longitudinal sectional view of Line $Y_1$-$Y_2$ in FIG. 4.
Figure 6:
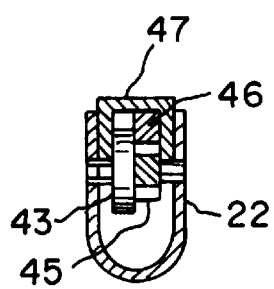
FIG. 6 shows the cross sectional view C—C in FIG. 4.

In FIG. 4, wire catcher 21 of the second unit 200 projects upward from second bearing disk 27 and opposite handle 22. Upper inclined circumference 24 of the bearing disk 27 has a constant radius from rotary center 0. The bearing disk 27 has a constant depth from the front surface of lower disk portion 23.

The 30° inclined insertion space 31 of second bearing disk 27 has a curved bottom 29 axially aligned with rotary center 0. A curved plane 28 of second bearing disk 27, having the same shape as that of the curved plane 9*a* is mounted in this insertion space 31. Rotary disk 34 having a constant thickness and constant radius, is incorporated between bearing disks 8 and 27 of the first 100 and second 200 units respectively. A front-facing circumference of the rotary disk 34 has a ratchet 32 with a plurality of 30° equally spaced inclined teeth. A rear facing circumference 33 is incorporated into first bearing disk 8. Curved face 35, having the same diameter as that of curved plane 9*a*, is linked to the left side of curved cutter 36 of rotary disk 34.

From rotary center 0, the third insertion space 37 is opened upward and together on the bottom of the insertion space. A curved cutter 36 is formed from the base of rotary center 0.

A feed pawl 38, is disposed on the lower disk portion 23 of bearing disk 27. The feed pawl 38 holds the ratchet 32 in a predetermined position. The lower disk portion 3 of the first bearing disk 8 has a fixed pawl 20, having an end 19 that interlocks with the feed pawl 38. A pushing spring 18 is mounted on the first lower disk portion 3 and retains the fixed pawl 20 against the inner circumference 4.

The upper end of a belt 40 is fixed to an arcuate side of the rotary disk 34. The belt 40 is deflected by rollers 41 and 42 mounted on the second lower disk portion 23. The middle portion of the belt is loaded through the second handle 22 onto an interlocking pulley 43. The other end of the belt 40 is fixed to an outer spring 44, disposed in a lower end of the second handle 22. Mounted on the pulley 43, is a gear 45 having one-half the diameter of the pulley 43. A push arm 47 located on an inside leg of second handle 22, travels in an interlocking relationship with the pulley 43 and has a pushing end 49 to push-up the tripper 39 on the feed pawl 38 for releasing the feed pawl 38 from the teeth of the ratchet 32. A rack 46 of the push arm 47 is mounted in parallel and within the second handle 22. The lower end of the push arm 47 is connected to an inner spring 50 in the second handle 22 by means of a wire 51.

The first 100 and second 200 units are axially joined at their respective rotary centers 0 to form the pliers of the present invention. As a result, the rotary disk 34 is incorporated into both bearing disks 8 and 27. The joining of the first and second units is accomplished as follows. The one side of the rotary disk 34 with circumferential ratchet 32 is incorporated into the bearing disk 27, and another relative plane is incorporated into the bearing disk 8. An upper inclined circumference 6 of the first unit 100 comes in contact with the upper inclined circumference 25 of the second unit 200. Catcher guide 5 comes in contact with upper inclined circumference 24*a* of the second unit 200. First lower inclined circumference 7*b* of upper fixing chip 54, comes in contact with second lower inclined circumference 26*b*. Inclined circumference 7*a* of lower disk portion 3 comes in contact with lower inclined circumference 26*a* of fixed chip 55 mounted on the upper rear of handle 22. These four contacted combinations enable both relative planes of the rotor 14, as a cutter in the bearing disk 8, and the curved cutter 36 of the rotary disk 34 to be in complete contact.

In operation, when the first and second handles 2, 22 are open, the three insertion spaces 12, 31 and 37 are in vertical alignment. An electric wire 56 is inserted into the aligned insertion spaces and is cut by moving the handles 2, 22 together. However, insertion of a very large diameter electric wire, such as a "$38^2$-IV" wire, into the vertically aligned insertion spaces 12, 31 and 37, causes the circumference of the wire 56 to be in contact with two planes of curved cutter 9*b* of rotor 14, curved cutter 36 of rotary disk 34, and the supporting point of the rotary center 0. Opening and closing the handles five times rotates the rotary disk 34 counterclockwise 150°, as each open and close movement of the handles turns the rotor disk 34, 30°. The large diameter wire can then be cut by first curved cutter 9*b* and curved cutter 36. After the wire is cut, the push arm 47 pushes tripper 39 of the feed pawl 38, by means of a gear 45 on a pulley 43 arranged to be interlocked with the belt 40 on the circumference of the rotary disk 34. When the handles are closed, a stopper 52 mounted on an upper portion of first handle 2 is pushed into stopper port 48 mounted in the raised push arm 47, thereby temporarily retaining the push arm 47 in a raised position along an inside leg of the second handle 22. While the handles 2, 22 are closed, feed pawl 38 is released from its temporary position in the ratchet 32 teeth, and the rotary disk 34 is returned to its original position by a descending action of the belt 40 caused by a retraction of the outer spring 44 extended during the counter clockwise rotation of the rotary disk 34.

Opening the handles separates the stopper 52 of first handle 2 from the stopper port 48 of push arm 47. Push arm 47 returns to its original position by retraction of the inner spring 50. Cutting subsequent electric wires is achieved by repeating the above operation.

Curved cutter 9*b* of rotor 14 is used for cutting electric wires having large diameters. See FIG. 7A. Electric wires having medium or small diameters are cut between circumferential cutter 16 and second curved cutter 36. With medium and small diameters, cutting is performed by rotating the rotor 14 such that the circumferential cutter 16 faces the second curved cutter 36. The rotor 14 is retained by one-way rotor ports 15*a*, 15*b*. Then the rotary disk 34 is rotated, for example, 60° by opening and closing the handle twice such that the insertion space is opened to the desired width. Feed pawl 38, wedged into a tooth on the ratchet 32, retains the rotary disk in a predetermined position. To return the rotary disk to its original position, the trip lever 53 on the inside leg of the first handle 2 is pulled, releasing fixed pawl 20 from the ratchet 32, so as to stop the rotation of the rotary disk 34. The trip lever 53 allows the rotary disk 34 to be positioned on the second handle 22 such that the curved cutter 36 can be opened 30° with respect to the second handle to insert a small diameter electric wire between the circumferential cutter 16 and the second curved cutter 36.

INDUSTRIAL APPLICATION

As discussed above, the supporting shaft having a constant radius has been a fundamental cause of the ineffective distances in the lever action. However, the present invention provides bearing disks having insertion spaces open from the rotary centers on the inside of both units of the pliers. The rotary disk of the present invention functions as a supporting shaft and positively uses the lever principle, resulting in a novel means for cutting electric wires between the curved cutter on the bottom of the insertion space and the curved cutter mounted on the bearing disk. Since the curved and circumferential cutters on the rotor can make contact with the rotary center, the circumference of the electric wire is able to make complete contacts with the cutter surfaces of the rotor, rotary disk and the rotary supporting points, thereby eliminating the ineffective distance of the lever action. Thus, the maximum cutting force can be obtained.

In the case of $38^2$-IV electric wires, in this invention, a nominal radius of 6 mm turns a 100% effective working distance. Cutting pliers having handles 180 mm from the supporting point have thirty times the cutting force of conventional pliers, or three times the cutting effect of the conventional cutting pliers. Rotating only one curved cutter enables easy cutting of electric wires having a large diameter. For cutting of electric wires having a medium or small diameters, the circumferential cutter 16 of the rotor 14 is used, producing a cutting force two times greater than that of the conventional cutting pliers.

In addition to these above-mentioned cutting advantages, both rotor 14 and rotary disk 34 can be conveniently replaced with new parts when worn.

The present invention is also applicable to other cutting tools and may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. Rotary cutting pliers comprising a first unit wherein a first bearing disk having a lower disk portion projects upward from a first handle and has a first insertion space for inserting a wire, that opens vertically upward from a rotary center of said first bearing disk and a second unit wherein a second bearing disk projects upward from a second handle and has a second insertion space for inserting a wire open upward and inclined from a rotary center of said second bearing disk; said first and second units are axially joined to each other at their respective rotary centers and a rotary disk having a toothed ratchet on the circumference and having a third insertion space open from the rotary center is incorporated between both bearing disks of the joined units; a first curved cutter is formed in insertion space of first bearing disk and a second curved cutter is formed from the rotary center in said third insertion space of rotary disk; a feed pawl on said second unit feeds said ratchet in angular increments and has a tripper for retaining the rotary disk in a predetermined position; a fixed pawl on said first lower disk portion has an end that interlocks with said feed pawl; and a trip lever mounted on first handle releases said fixed pawl from said ratchet teeth so as to stop the rotation of the rotary disk; a belt is fixed on said rotary disk and turns said rotary disk in a direction reverse to the rotation of said ratchet; an outer spring is connected to said belt and a push arm located on an inner leg of second handle, is configured so as to travel in an interlocking relationship with a pulley fixed to the middle portion of said belt, having a pushing end to push up said tripper on said feed pawl and to release said feed pawl from the teeth of said ratchet; a stopper port is mounted on an upper portion of inner spring to pull said push arm downward when a stopper mounted on an inner leg of first handle is removed from said stopper port.

2. The rotary cutting pliers as claimed in claim 1, wherein said first curved cutter is mounted on the circumferential cutter of the rotor embedded in the bearing disk of the first unit.

3. The rotary cutting pliers as claimed in claim 2, wherein one-way rotor ports are on the circumference of the rotor and an adjustment lever that is mounted on the first bearing disk, is accommodated in the rotor ports to retain the rotor in a predetermined position.

\* \* \* \* \*